2,967,843
Patented Jan. 10, 1961

2,967,843

EPOXY RESIN COMPOSITION HAVING HIGH HEAT STABILITY

John Delmonte, Glendale, and Frank N. Hirosawa, Los Angeles, Calif., assignors to Furane Plastics Incorporated, Los Angeles, Calif., a corporation of California No Drawing. Filed Nov. 19, 1956, Ser. No. 622,774

16 Claims. (Cl. 260—37)

This invention relates to epoxy resin compositions having relatively high heat stability after curing.

One object of the invention is to provide an epoxy resin composition which, when cured, has unusual stability at high temperatures. Another object is to provide an uncured epoxy resin composition which remains unchanged for long periods of time when kept at room temperatures. Still another object is to provide an epoxy resin composition which, after curing, maintains appreciable physical strength even after being subjected to temperatures as high as 1000° F. A further object is to provide an epoxy resin composition, including mineral fillers, which, when cured, retains its physical and electrical properties at elevated temperatures as high as 500° F.

We attain these and other objectives by our discovery which broadly consists of forming at room temperature a clear stable liquid polymerizable composition by reacting a liquid epoxy resin with a maleic anhydride adduct or combination of adducts, prepared from the monomer of cyclopentadiene, the monomer of methyl cyclopentadiene, or the homologues of these; that this liquid resinous composition, when mixed with minor proportions of certain specific secondary and tertiary amines as catalysts, may be cured in a few minutes at temperatures around 300° to 340° F.; and that the rigid resins thus formed may be post curved at temperatures up to 500° F. to greatly enhance the physical properties attained at the lower temperature cure. We have further discovered that when these unset compositions are mixed with mineral fillers or formed into laminates with fiber glass, and then cured, they may be successfully empolyed at temperatures as high as 500° F.

The epoxy resins which we prefer in our composition are liquid epoxy resins containing active epoxide groups as well as hydroxyl groups in the polymer chain, capable of initiating reactions with anhydride groups. The epoxy resins which appear desirable in our reaction are generally prepared from epichlorohydrin and various bisphenols, such as the phenolic resin "novolaks," 2,2'-bis(p-hydroxyphenyl)propane or alkyl substituted derivatives thereof. We prefer to use liquid epoxy resins which fall in the range of 180 to 250 grams of resin per mole of epoxy equivalent, and an optimum range appears to be 175 to 220 grams per equivalent, as related to high temperature stability.

The maleic anhydride adducts of cyclopentadiene, methyl cyclopentadiene, and the homologues of these, may be used in our invention, but we prefer to use the maleic anhydride adduct of methyl cyclopentadiene, for the reason that its reaction may be readily controlled and also because it is a liquid product and therefore more easily handled. The adduct preparation may contain also minor proportions of the adducts of cyclopentadiene, as well as minor proportions of the higher homologues of these adducts, which products usually are formed with the adduct of methyl cyclopentadiene in the usual methods of production [Diels and Alder, Annalen, vol. 460, p. 111 (1928); Book, "New Methods of Preparative Organic Chemistry" K. Alder. "Preparation of Methyl (isomers)-3,6-Endomethylene-4-tetrahydrophthalic-anhydride." (New York 1948); Fieser and Fieser "Organic Chemistry" 1944 D. C. Heath and Co. pages 304–305]. Free maleic anhydride may also be present with the adduct products, and we have observed improved results when from 10 to 30 percent of the free anhydride is present or is added.

An optimum molar ratio of the epoxy resin ingredient to the adduct ingredient has been found to be in the range from about 1 mole of the epoxy resin to 0.75 moles of adduct, to about 1 mole of epoxy resin to 1 mole of the adduct ingredient. This optimum relates to the development of the maximum stability of the cured products at relatively high temperatures, and other proportions may be used without attaining the superior heat stability in the product.

The amine catalysts which have been found to produce good cures of our epoxy-maleic anhydride adduct material are the primary, secondary and tertiary amines and substituted amines, including specifically alpha methyl benzylamine, benzyl dimethylamine, dimethyl amino methyl phenol, tri(dimethyl amino methyl) phenol, dimethylamino propylamine, and diethylamino propylamine. The proportion of the amine catalyst to be employed is preferably in the range of 0.1 to 2.0 weight percent, since it was found that the high temperature stability is greatly decreased by the use of more than about 2 percent, or less than about 0.1 percent, and in the latter case, the time of cure becomes inordinately long. Without the amine catalyst, it required curing at temperatures of 300° to 350° F. for several hours. It was advantageous in some compositions to pre-mix or pre-react the amine catalyst with the anhydride.

Improvements in properties of the cured resins have been observed when minor amounts of hexahydrophthalic anhydride, tetrahydrophthalic anhydride and chlorinated derivatives of maleic anhydride adducts, such as "het anhydride" or the methyl cyclopentadiene adducts formed with monochloro or dichloro maleic anhydride, are added to the resin-adduct-catalyst combinations in minor proportions.

In general, the mixing of the amine catalyst with the reaction ingredients previously described yielded a liquid product, stable for at least 24 hours at room temperature, or stable for at least a month as a partly cured product, (after being pre-reacted to form a thickened, gelled or stage solidified state by being heated at 150° to 200° F.) both intermediate stages being capable of curing at temperatures of 250° to 400° F. at moderate low pressures. The preferred curing temperature range is 300° to 340° F. for a time of 10 to 30 minutes. Pressures may be merely contact pressure for the liquid stage and low pressures of 10 to 100 pounds per square inch in the cast of the thickened, partly cured stage.

The term "thickened" is here meant to include the so-called "Stage B" where the product is dry at room temperature but is soluble in solvents, and may be subsequently used in solution form for preparing laminates, following well known practices.

Once the resin composition has been formed into a cured product (as for example as in the formation of a rigid system such as a laminated structure), we have found that much improved properties were obtained by further "post cure." Although laminated fiber glass panels could be placed in the heating chamber at 500° F. immediately after the first cure without fear of delamination, we prefer to expose the low temperature cured resin products to a staged cure of 300° to 400° F. for several hours, followed by at least two hours at 500° F. Unlike other resin systems, this prolonged exposure at 500° F. appeared to double the strength of our resin at 500° F., thus achieving physical property values which could not be reached even by very long exposure to 400° F. post cure. For example, the following properties were exhibited by a laminate consisting of 14 plies of No. 181, Volan A treated glass cloth, fabricated with the resin reaction product of one mole of liquid epoxy resin (190 to 210 grams per epoxy mole equivalent) to 0.80 mole of maleic anhydride adduct of methyl cyclopentadiene and one per cent by weight of tris-dimethyl-amino methyl phenol:

Cured at 320° F. for 20 minutes: P.s.i.
   Room temperature flexural strength ------ 75,000
   Flexural strength at 500° F. ------------- 8,000
Post cured 10 to 15 hours at 400° F.:
   Room temperature flexural strength ------ 80,000
   Flexural strength at 500° F. ------------- 12,000
Post cured 4 hours at 500° F.:
   Room temperature flexural strength ------ 80,000
   Flexural strength at 500° F. ------------- 22,000

These values for high temperature flexural strengths are maintained even after 200 hours at 500° F., which is believed to be unique in this art.

It has also been observed that when resin bonded glass laminates of our materials are brought to temperatures in excess of 1,000° F., while there will be no copious evolution of gaseous products, there is not complete disintegration of the organic structure, and there will be some structural stability after long heating, though of a lower order of strength. Specific inorganic fillers, such as clay, mica or glass, may be used to improve this structural stability after excessively high temperatures have partly destroyed the organic structure.

Various inert mineral reinforcing powders may be incoporated with these resin compositions, and particularly good results were obtained using 325 mesh silica (up to 200 percent), 325 mesh mica (up to 100 percent) and finely ground titanium dioxide (up to 100 percent), when added to our resin before casting or laminating.

Other examples of our resin reaction products are:

Example 1

One mole of liquid epoxy resin (viscosity of 24,000 centipoises at 23.5° C. and an epoxy equivalent 208) was reacted with 0.75 moles of maleic anhydride adduct of methyl cyclopentadiene and 0.10 mole of maleic anhydride at room temperature. Two percent by weight of alpha methyl benzylamine was added. The resin reaction product slowly thickened to about 30,000 centipoises in three days. Portions taken out at times during this interval were formed as a laminated product and cured at 300° to 350° F., and mixed with silica fillers and cast into strong, dense castings. High temperature properties were obtained by final baking at 500° F.

Example 2

One mole of a lump epoxy resin (epoxy equivalent 416) was disolved in 0.5 mole of a maleic anhydride adduct of methyl cyclopentadiene. The combination was mixed with mineral reinforcing powders and cured at a temperature of 320° to 330° F. until a hard, dense, insoluble casting was produced. Improved high temperature mechanical properties were obtained by post curing at 400° F. or higher.

Example 3

One mole of a liquid epoxy resin from bisphenol A and epichlorohydrin (190 to 195 grams per epoxy equivalent) was blended with 0.90 mole of maleic anhydride adduct of methyl cyclopentadiene and 0.10 mole of pyromellitic dianhydride. The combination was catalyzed by adding one-half of one percent diethylamino propylamine. The liquid was used both for laminating fiber glass and for casting after adding inorganic reinforcing powders. Superior high temperature properties resulted from post curing at 500° F.

Example 4

One mole of a liquid epoxy resin (epoxy equivalent 190 to 200) was reacted with one mole of maleic anhydride adduct of methyl cyclopentadiene at 200° F. until a viscosity of 20,000 centipoises (at 23.5° C.) was reached. To this was added one percent of tri(dimethylamino methyl)phenol as a catalyst. This reaction product formed an excellent casting and laminating resin having higher than usual mechanical properties.

Example 5

A series of resins were prepared from maleic anhydride and methyl cyclopentadiene adduct of maleic anhydride, co-reacted with substantially equal moles of liquid epoxy resin (epoxy equivalent 455 to 540), one percent dimethylamino methyl phenol catalyst being used. After post cure at 500° F., the results were as follows:

| Anhydride | Adduct | Epoxy Resin | Flexural Strength at Room Temperature, p.s.i. | Flexural Strength at 500° F., p.s.i. |
|---|---|---|---|---|
| 0 | 100 | 100 | 80,000 | 18,000 |
| 20 | 80 | 100 | 85,000 | 20,000 |
| 50 | 50 | 100 | 75,000 | 12,000 |

Example 6

A thin penetrating mixture was prepared by combining 100 parts by weight of a 16,000 centipoise (at 23.5° C.) epoxy resin (epoxy equivalent 200) with 10 parts by weight of a reactive diluent, butyl glycidyl ether. When this mixture was reacted with a maleic anhydride adduct of methyl cyclopentadiene, a strong stable resin was developed. Boron trifluorideamine catalyst was used as the catalyst.

Example 7

One mole of a liquid epoxy resin from bisphenol A and epichlorohydrin (190 to 195 grams per epoxy equivalent) was blended with 0.6 mole of pyromellitic dianhydride and 0.2 moles of maleic anhydride adduct of methyl cyclopentadiene. One-half of one percent of diethylamino propylamine was added as catalyst. The product was similar to that described as Example 3.

Example 8

To one mole of epoxy resin (epoxy equivalent 185 to 220 diluted or non-diluted with glycidyl ethers) was added 0.8 to 1.0 mole of dichloromaleic anhydride adduct of methyl cyclopentadiene. A more highly colored reaction product was formed which cured at 300° to 350° F., accelerated by the presence of a tertiary amine (up to 1 percent).

Example 9

Similar resins to those of Example 8 were also prepared using the monochloromaleic anhydride adduct of methyl cyclopentadiene, with the epoxy resin.

Example 10

It was also observed that the reaction product of liquid epoxy resins (epoxy equivalent 185 to 220) and the maleic anhydride adduct of methyl cyclopentadiene was particularly reactive when the mole ratio was approximately 1 of epoxy to about 0.33 of the anhydride, as shown by the range of compositions giving physical properties as indicated in the table:

| Weight of Liquid Epoxy Resin, Parts | Weight of Maleic Anhydride Adduct of Methyl Cyclopentadiene, Parts | Initial Viscosity at 75° F., cps. | Viscosity After Three Days at 150° F., cps. |
|---|---|---|---|
| 100 | 0.5 | 18,400 | 19,000 |
| 100 | 25 | 6,900 | 22,400 |
| 100 | 50 | 3,800 | 12,800 |
| 100 | 75 | 2,400 | 6,000 |

Example 11

A group of resin compositions were prepared from liquid epoxy resins (epoxy equivalent 175 to 230 grams) co-reacted with mixtures of maleic anhydride adducts of cyclopentadiene and methyl cyclopentadiene, the proportions of the two dienes being in the range from 10 to 40 percent of the cyclopentadiene adduct to from 90 to 60 percent of the methyl cyclopentadiene adduct. These compositions cured to hard castings at 300° to 350° F. both with and without the addition of a tertiary amine catalyst.

Example 12

One mole of a liquid epoxy resin (epoxy equivalent 190 to 200) was reacted with one mole of maleic anhydride adduct of methyl cyclopentadiene, the mixture being heated for six hours at about 300° F. followed by heating for 16 hours at 400° F. A hard, heat stable body was produced.

Reaction products of maleic anhydride adduct of methyl cyclopentadiene and the liquid epoxy resin may be used immediately for laminating or casting, although for optimum physical properties they may be reacted to viscosities of 3,000 centipoises to 25,000 centipoises before the addition of the amine catalyst.

The advantages of our invention will be apparent from the above description and the illustrative examples. For the first time stable epoxy resin compositions are provided which may be rapidly cured and post cured to produce high thermal stability and strengths at elevated temperatures. Cured compositions of these resin products which include inert mineral fillers may be used for long periods of time at temperatures as high as 500° F. After curing and post curing there is little or no tendency for the resin to form gas, and laminated products do not delaminate. The product may be initially cured in the short time of 10 to 15 minutes at 320° F.

We claim:

1. An uncured resin composition containing as essential ingredients an uncured liquid polyglycidal ether of 2,2 bis (4-hydroxy phenyl) propane resin of which 185 to 220 grams provides one epoxy mole equivalent, and having a viscosity in the range from 10,000 to 30,000 cps.; and a liquid adduct of maleic anhydride and methyl cyclopentadiene; the proportion by weight of the epoxy resin to the adduct being in the range from one mole of epoxy resin to 0.33 mole of adduct to one mole of epoxy resin to 1.2 moles of adduct.

2. An uncured resin composition containing as essential ingredients an uncured liquid polyglycidal ether of 2,2 bis (4-hydroxy phenyl) propane resin of which 185 to 220 grams provides one epoxy mole equivalent, and having a viscosity in the range from 10,000 to 30,000 cps.; a liquid adduct of maleic anhydride and methyl cyclopentadiene; and free maleic anhydride; the proportion by weight of the epoxy resin to the adduct being in the range from one mole of epoxy resin to 0.33 mole of the adduct, to one mole of epoxy resin to 1.2 moles of adduct, and the free maleic anhydride being being not more than about 30 percent of the weight of the constituent.

3. An uncured liquid resin composition containing as essential ingredients an uncured polyglycidal ether of 2,2 bis (4-hydroxy phenyl) propane resin of which 185 to 220 grams provides one epoxy mole equivalent, and having a viscosity in the range from 10,000 to 30,000 cps.; a liquid adduct of maleic anhydride and methyl cyclopentadiene; free maleic anhydride; and from one-fourth to two percent based upon the weight of the composition of an amine selected from the group consisting of alpha methyl benzylamine, benzyl dimethylamine, dimethyl amino methyl phenol, tri(dimethylamino methyl) phenol, dimethylamino propylamine, and diethylamino propylamine; the proportion by weight of the resin to the adduct being in the range from one mole of resin to 0.33 mole of the adduct, to one mole of resin to 1.2 moles of adduct; the free maleic anhydride being not more than about 30 percent of the weight of the adduct constituent, and the said catalyst being present in amounts in the range of one-quarter of one percent to two percent by weight based upon the weight of the whole composition.

4. An uncured resin composition defined in claim 3; and an inert mineral reinforcing agent, the weight proportion of said agent being at least equal to the weight of the resin-adduct ingredients.

5. The resin composition defined in claim 3 which has been partly cured by heating to temperatures not over 400° F. for several hours until a solid body is formed.

6. The resin composition defined in claim 3 which has been partly cured to a solid body by heating at temperatures not over 400° F., and which has subsequently been post-cured for at least 2 hours at temperatures about 500° F.

7. The resin composition defined in claim 4 which has been partly cured to a solid body by heating at temperatures not over 400° F. for several hours until a solid body is formed.

8. The resin composition defined in claim 4 which has been partly cured to a solid body by heating at temperatures not over 400° F., and which has been subsequently post-cured for at least 2 hours at temperatures about 500° F.

9. The method of forming a curable, room-temperature-stable epoxy resin product consisting of the steps of mixing an uncured liquid polyglycidal ether of 2,2 bis (4-hydroxy phenyl) propane resin of which 185 to 220 grams provides one epoxy mole equivalent, and having a viscosity in the range from 10,000 to 30,000 cps.; with free maleic anhydride and a liquid maleic anhydride adduct of methyl cyclopentadiene, the proportions being in the range from 0.8 to 3 moles of resin for each mole of adduct, whereby to form a liquid reaction mixture stable for a day or more at room temperatures; then adding a catalytic amount of an amine polymerizing catalyst selected from the group consisting of alpha methyl benzylamine, benzyl dimethylamine, dimethyl amino methyl phenol, tri(dimethyl amino methyl) phenol, dimethylamino propylamine, and diethylamino propylamine to said reaction mixture; and heating said mixture to about 175° F. for sufficient time to form a thickened liquid, partly cured product stable for a month or more at room temperatures.

10. The method of forming a heat stable epoxy resin product consisting of the steps of mixing an uncured polyglycidal ether of 2,2 bis (4-hydroxy phenyl) propane resin of which 185 to 220 grams provides one epoxy mole equivalent, and having a viscosity in the range from 10,000 to 30,000 cps.; with free maleic anhydride and a liquid maleic anhydride adduct of methyl cyclopentadiene, the proportion being in the range from 0.8 to 3 moles of resin for each mole of adduct, and the free maleic anhydride being not more than about 30 percent of the weight of the adduct constituent, whereby to form a reaction mixture stable for a day or more at room temperatures; then adding a catalytic amount of an amine polymerizing catalyst selected from the group consisting of alpha methyl benzylamine, benzyl dimethylamine, dimethyl amino methyl phenol, tri(dimethylamine methyl) phenol, dimethylamine propylamine, and diethylamino propylamine to said reaction mixture; heating said mixture to about 175° F. to form a thickened liquid, partly cured product stable for a month or more at room temperatures; and then heating said partly cured product to a temperature in the range of 250° to 400° F. for a time sufficient to form a rigid resin product.

11. The method of forming a heat stable epoxy resin product consisting of the steps of mixing an uncured polyglycidal ether of 2,2 bis (4-hydroxy phenyl) propane resin of which 185 to 220 grams provides one epoxy mole equivalent, and having a viscosity in the range from 10,000 to 30,000 cps.; with free maleic anhydride and a liquid maleic anhydride adduct of methyl cyclopentadiene, the proportion being in the range from 0.8 to 3 moles of resin for each mole of adduct, and the free maleic anhydride being not more than about 30 percent of the weight of the adduct constituent, whereby to form a reaction mixture stable for a day or more at room temperatures; then adding a catalytic amount of an amine polymerizing catalyst selected from the group consisting of alpha methyl benzylamine, benzyl dimethylamine, dimethyl amino methyl phenol, tri(dimethyl amino methyl) phenol, dimethylamino propylamine, and diethylamino propylamine to said reaction mixture; mixing an inert mineral reinforcing powder to said reaction mixture; heating said mixture up to about 175° F., whereby to form a thickened liquid, partly cured product stable for a month or more at room temperatures; then heating said partly cured product to a temperature in the range of 250° to 400° F. for a time sufficient to form a rigid resin product; and post-curing said rigid product by heating for at least two hours at not less than 500° F.

12. A stable hardener adapted for hardening an uncured liquid polyglycidal ether of 2,2 bis (4-hydroxy phenyl) propane resin of which 185 to 220 grams provides one epoxy mole equivalent, and having a viscosity in the range from 10,000 to 30,000 cps.; composition consisting of a partly reacted liquid mixture of a liquid maleic anhydride adduct of methyl cyclopentadiene, and an amine polymerizing catalyst selected from the group consisting of alpha methyl benzylamine, benzyl dimethylamine, dimethyl amino methyl phenol, tri(dimethyl amino methyl) phenol, dimethylamino propylamine, and diethylamino propylamine.

13. A composition of matter containing as essential ingredients a liquid polyglycidal ether of 2,2 bis (4-hydroxy phenyl) propane resin of which 185 to 220 grams provides one epoxy mole equivalent, and having a viscosity in the range from 10,000 to 30,000 cps.; composition consisting of a partly reacted liquid mixture of a liquid maleic anhydride adduct of methyl cyclopentadiene, and an amine polymerizing catalyst selected from the group consisting of alpha methyl benzylamine, benzyl dimethylamine, dimethyl amino methyl phenol, tri(dimethyl amino methyl) phenol, dimethylamino propylamine, and diethylamino propylamine.

14. The composition defined in claim 13 in which said resin-adduct mixture also includes from one-fourth to two percent amine hardener selected from the group consisting of alpha methyl benzylamine, benzyl dimethylamine, dimethyl amino methyl phenol, tri(dimethyl amino methyl) phenol, dimethylamino propylamine, and diethylamino propylamine.

15. A glass cloth laminate structure comprising superimposed layers of glass cloth impregnated and bonded together by a polyglycidal ether of 2,2 bis (4-hydroxy phenyl) propane resin-maleic anhydride methyl cyclopentadiene adduct mixture, the proportion being in the range from 0.8 to 3 moles of resin for each mole of the adduct, said glass cloth resin structure having been cured for at least 2 hours at a temperature of not less than 500° F.

16. The glass cloth laminate structure defined in claim 15 in which said resin-adduct mixture also includes a minor proportion of one-fourth to 2 percent based upon the resin-adduct of an amine hardener selected from the group consisting of alpha methyl benzylamine, benzyl dimethylamine, dimethyl amino methyl phenol, tri(dimethyl amino methyl) phenol, dimethylamino propylamine and diethylamino propylamine.

References Cited in the file of this patent

UNITED STATES PATENTS

| 2,324,483 | Castan | July 20, 1943 |
| 2,744,845 | Rudoff | May 8, 1956 |
| 2,768,153 | Shokal | Oct. 23, 1956 |

OTHER REFERENCES

Schenhter et al.: Ind. & Eng. Chemistry, vol. 48, No. 1, January 1956, pages 91–93.

"PMDA," A Curing Agent for Epoxy Resins, E. I. du Pont de Nemours and Company (Explosives Dept.), supplement 2, pages 1–18, dated August 1956.